United States Patent [19]

Petroff

[11] Patent Number: 4,730,727
[45] Date of Patent: Mar. 15, 1988

[54] DISKETTE FILE

[76] Inventor: John Petroff, 6035 Broadway, Apt. 6-A, Riverdale, N.Y. 10471

[21] Appl. No.: 8,140

[22] Filed: Jan. 22, 1987

Related U.S. Application Data

[63] Continuation of Ser. No. 728,681, Apr. 29, 1985.

[51] Int. Cl.⁴ ............................................. B05D 27/08
[52] U.S. Cl. ...................................... 206/311; 229/72; 229/DIG. 3; 206/425; 383/40
[58] Field of Search .................. 200/425, 311; 229/72, 229/DIG. 3; 383/40

[56] References Cited

U.S. PATENT DOCUMENTS

| | | | |
|---|---|---|---|
| 508,394 | 11/1893 | Andrews | 229/72 |
| 635,582 | 10/1899 | Pedrick | 206/425 |
| 923,539 | 6/1909 | Law | 229/72 |
| 1,341,157 | 5/1920 | Sublett | 383/40 |
| 1,487,088 | 3/1924 | Casey | 206/311 |
| 1,499,712 | 7/1924 | Wilburger | 206/311 |
| 1,551,302 | 8/1925 | Gabel | 206/311 |
| 2,151,469 | 3/1939 | Hochtheil | 229/72 |
| 2,323,245 | 6/1943 | Schenker | 206/311 |
| 4,262,838 | 4/1981 | Mackenzie | 229/72 |
| 4,313,558 | 2/1982 | Benham | 229/DIG. 3 |
| 4,331,290 | 5/1982 | Benham | 229/DIG. 3 |

FOREIGN PATENT DOCUMENTS 126788  2/1948  Australia ............................. 229/72

Primary Examiner—Joseph Man-Fu Moy
Attorney, Agent, or Firm—Collard, Roe & Galgano

[57] ABSTRACT

A binder made of a rigid covering case and containing an assemblage of envelopes constitutes a diskette file. The diskette file provides a secure receptacle suitable for storage of 10, 20, or any number of magnetic diskettes used on microcomputers. When the binder is open, an accordion-like assemblage of envelopes structure expands to form a fan of the diskettes stored in the envelopes. The top of each diskette in the fan of the open binder is revealed and a single diskette can be located and retrieved without having to manipulate any of the other diskettes in the file. The assemblage of envelopes is bound to the covering case. The case consists of 5 coupled and hinged sections; front, bottom, back, top and flap. The flap folds over and attaches to the front panel. When such a binder is closed, the book-like diskette file may contain a large number of diskettes in a well-protected, organized filing pattern suitable for cataloguing and storage in library book-shelf fashion.

9 Claims, 12 Drawing Figures

DISKETTE FILE

REFERENCE TO RELATED APPLICATION

This is a continuation application of application Ser. No. 728,681, filed Apr. 29, 1985, for "DISKETTE FILE".

BACKGROUND

The diskette file described in this specification applies primarily to 5¼ inch magnetic diskettes used on microcomputers. The most common method of storage of these diskettes is to use the original cardboard box in which the diskettes were purchased. Such filing method has several drawbacks. These drawbacks stem primarily from the delicate nature of the diskettes. The diskette is enclosed in a square sealed plastic container which has open slots to permite the reading and storing of data on the diskette. If human fingers touch the diskette through the open slots, the magnetic data stored on the diskette may be destroyed. An envelope is usually provided, but it is not always used and can be lost. Thus, the manipulation of the diskettee ought to be reduced to a minimum. The storage in the cardboard box requires that all the diskettes be taken out of the box in order to determine if the desired diskette is located in that box. Some of the boxes made of lightweight cardboard and can be crushed easily. When the box is made of sturdier cardboard, the cover is not secured to the box and the diskettes can fall out (especially if the box falls on the floor).

The second drawback of this method of storage is the large amount of time necessary to go through all the diskettes in the box to find a desired diskette.

Several methods of storing diskettes to avoid some the difficulties discussed in the previous paragraph, have been devised. Some of these methods have been patented. The most relevant patents are the following:

| | | |
|---|---|---|
| 1,173,388 | 2/1916 | Rosenberg |
| 3,924,742 | 12/1975 | Primicerio |
| 4,225,038 | 9/1980 | Egly |
| 4,231,474 | 11/1980 | Takahoshi |
| 4,325,595 | 4/1982 | Solomon |
| 4,369,879 | 1/1983 | Egly et al. |
| 4,375,263 | 3/1983 | Dwarkin |
| 4,396,119 | 8/1983 | Guilie |
| 4,479,577 | 10/1984 | Eichner et al. |
| 4,488,577 | 12/1984 | Yawagchi |

These methods differ significantly from the diskette file presented in this specification. They all use a box type storage which adequately solves the shortcomings of the fragility of the cardboard box, but they do not offer adequate safeguard from diskette manipulation and are therefor also time inefficient.

The box type of storage of diskettes does not resolve the problem of retrieval of a diskette from a file. The diskettes are arranged in an index-card fashion which requires flipping one diskette at a time in order to be able to read each diskette label until the desired diskette is reached. In addition, the envelopes are not secured inside the box and can therefore be lost or misplaced. Furthermore, the envelopes being lose, these methods do not, and can not, provide for a permanent assigned location for each diskette.

To facilitate the flipping of the diskettes, the front and back of the box are inclined, as in the Egly's storage box of 9/1980. Likewise, Guilie's storage box is "V" shaped for the same reason. Eichner's container relies on a pivoting inner construction to form a "V" configuration with the cover of the box. Dwarkin's compartments can be bended to form the "V" for flipping diskettes.

Egly's disk storage box of 1/1983 and Yawagchi's case are more secure receptacles than the 4 boxes discussed in the previous paragraph. But, in both instances the retrieval problem is aggravated by the necessity to take the diskettes out of the case. In addition, Egly's disk storage box of 1/1983 provides for very limited storage space: only a 2 or 3 diskettes can fit in the space provided.

In the box approach of diskette filing, the flipping may irritate the individual conducting the search and lead him/her to taking all the diskettes out of the container and fan them to see the labels more rapidly. In such instance the risk of damage to the diskette is aggravated. If the searcher chooses to flip the diskette conscientiously, a lot of time can be wasted.

In addition to the time inefficiency, the box approach is highly space inefficient. The need "V" for the file search imposes the need for additional devises (as in Eichner) or special shape (as in Guilie) which take space. This problem is especially serious when very large numbers of diskettes have to be stored. None of these methods would be ameanable to book-like method of storage of these devises on the shelves of a library.

The expandable folder type of file has been used for many different types of purposes. Some of these folder files have been patented. The most relevant patents in this context are the following:

| | | |
|---|---|---|
| 528,420 | Estlow | 10/1894 |
| 763,797 | Rueve, Jr | 6/1904 |
| 979,213 | Shedd | 12/1910 |
| 1,202,069 | Kantro | 10/1916 |
| 1,586,016 | Walters | 5/1926 |
| 2,416,816 | Compagnano | 3/1947 |
| 2,799,391 | Eisner | 7/1957 |
| 3,113,573 | Schler | 12/1963 |
| 4,313,558 | Benham | 3/1982 |
| 4,331,290 | Benham | 5/1982 |

In addition, numerous patents have been issued for various configurations permitting to reveal the contents of a storage apparatus; for instance U.S. Pat. No. 3,154,125, 2,799,391, 2,431,472, and 3,850,083. The overall structures in these 4 inventions are not appropriate for storage of diskettes.

The diskette file of the present specification differs significantly from the structures of the folder type of files of the patents which are listed above. Benham's multiple pocket expandable envelopes of 2/1982 and 5/1982 are not suitable for the purpose of storing the diskettes so that they may be retrieved efficiently for at least 4 of the following reasons.

First, Benham's envelopes are not designed to allow the contents to be exposed because the cover is hinged at the hight of the envelopes in order to protect the contents; this requires the material inserted in the envelope not to exceed the hight of the envelope and would prevent a quick inspection of the nature of that material. Secondly, Benham's envelopes do not provide for a rigid closable covering case which would secure the diskette from possible crushing or spillage; instead, the entire structure is made of the same pliable material. Thirdly, the bottom of Benham's folder of 5/1982 is made of folding parts and is, therefor, not rigid; this would prevent the folder from opening in a fan-like fashion. Finally, Benham's envelopes are made of a complex cut-out single sheet assembly which is appropriate for a small number of pockets: it would be too cumbersome for a large number of dividers such as 20 or more.

Shedd's plaited binder and Schler's expandable folder also differ from the present diskette file by their folding flexible bottoms. In addition, their gusset construction is undesirable for storing diskettes because more than one diskette could then fit in a single pocket.

One type of multiple envelope receptacle which is akin to the diskette file is that of phonograph disk record album holder files. Several of these have been patented; most notably

| 1,487,088 | Casey | 3/1924 |
| 1,499,712 | Wilburger | 7/1924 |
| 1,551,302 | Gabel | 8/1925 |
| 2,323,245 | Schenker | 6/1943 |

Approximately 16 other patents have been issued for phonograph disk holders which basically consist of envelopes assembled as pages of a book-like file. The 4 patents cited above and the other 16 patents differ significantly from the diskette file presented in this specification.

First, the groves of phonograph disks, being exposed, require the disk holder design to provide for maximum protection by covering the disks in almost their entirety. The cut-outs permit the grasping of the disk or reading of the label located at the center. The microcomputer diskette is only vulnerable at its open slots located in the bottom half of the enclosing plastic container. Thus the diskette need not be covered in its entirety. On the contrary, it is imperative that the configuration of the file provides for the upper part of the diskette to be exposed allowing the reading of the label located there.

Because of the location of the label on the phonograph disks, the identification of the content of envelopes is accomplished by either inscription at the top of envelopes (as in Casey, Gabel and Schenker) or by allowing the central label to be shown (as in Wilburger). Such identification difficulties are not present for diskettes.

The combination of (1) shape of the envelopes (covering entire disk) and (2) method of identification, imposes, in turn, that almost all disk holders to be made of separate envelopes so that they can either (1) slide over each other to overlap (as in Cabel and Casey) or (2) be flipped (as in Wilburger). These envelopes are held together by only some form of attachment at the bottom extremety: with cardboard strips in Cabel and Casey or posts going through holes in wilburger. This method of attachment is considerably inferior in strength to that of the assemblage of envelopes of the diskette file (where each envelope is affixed to the next over its almost entire body). In Wilburger, the structure is further weakened by the needed spare space to allow flipping. The phonograph disk holder method also imposes the use of stronger and more costly materials for individual envelopes than is necessary for diskettes.

However, the major drawback of using phonograph disk holder type of files for diskettes is that of the difficulties that would be encountered in inserting diskettes in that type of file. A phonograph disk, being round with a smooth edge, can slide easily into a single envelope (in the Wilburger, Casey and Gabel structure) or in the slit (of the Schenker structure). Microcomputer diskettes, being enclosed in a square plastic container and the container having a minimum of 3 notches, would require a delicate, time consuming holding of the opening with one hand while sliding the diskette with the other. In spite of all the care, the notches would eventually catch on the edges of the slit (in Schenker structure) or envelope (in Wilburger, Casey and Gabel structures), and tear the sides. This problem is avoided in the diskette file by having the envelopes in a permanently open position (caused by the casing structure), which is further expanded when the entire assemblage is stretched, (which can be done with one hand). In addition, the extended back of each envelope in the diskette file guides the diskette into the envelope and avoids the possibility of notches catching on the edges of the envelopes and tearing them.

Lastly, the presence of posts in Wilburger construction does not interfere with a round phonograph record, but they would interfere with square diskettes.

SUMMARY OF THE INVENTION

The object of the invention is to provide a safe storage for microcomputer diskettes, to save time when filing such diskettes, to save time when retrieving them from a file, and to provide for a convenient method of storage of a large number of those diskettes. The safety results from the structure of the diskette file itself and from the way the diskettes are filed in it and retrieved from it.

The diskette file protects the diskettes by having a covering case made of an appropriate material to prevent the diskettes from being crushed or damaged when they are in the binder. Various bookbinding reinforcements of the binder suggested in the description, are intended to give further security for the diskettes in the diskette file and additional strength for the file itself, so that it can be stored on book shelves. When closed with an appropriate clasp, string, stretching band or other device, the covering case keeps the diskette inside the binder even if the binder happens to fall from a shelf or other place of storage.

The lose envelopes which normally protect the open slot of the diskette are no longer needed because the diskettes have their own assigned envelope in the assemblage of envelopes in the binder. Thus, the chances of lost or misplaced envelope, and therefor unprotected slot are considerably reduced.

When diskettes are filed into or retrieved from the file, the chances of damaging any other diskette in the file are also greatly reduced because the other diskettes do not have to be handled.

The speed of filing and retrieving diskettes is the major object of the invention. When a person is working at a desk many different papers may be present on it, and when a diskette has to be filed, the small envelope for that diskette would have to be located among the numerous papers on the desk (if a diskette file is not used). Such misplaced envelope is not possible with the diskette file, since the envelopes are bound together in a relatively large volume which can be easily picked out on the desk. This reduces possible time loss.

The saving in time is especially significant when a large number of diskettes are being worked on; for instance, a manuscript may consist of 20 or more diskettes. In such a case, putting back the diskette in the right location may require manipulation of the other diskettes (if a diskette file is not used). With the binder open, the assigned location of the unfiled diskette is observed almost instantaneously as the fan of diskettes reveals the open location. Mistakes in filing can also be avoided if the envelopes are numbered in a sequence corresponding the the diskette designations.

The time saving in retrieving the correct diskette is even more substantial than in the filing process. The desired diskette can be quickly located because all the labels on the diskettes in the fan of diskettes in the open binder can be read instantaneously. No flipping is needed. The efficiency of the filing system with the use of this invention becomes very apparent when large numbers of diskettes (say several hundreds) have to be inspected for the presence of a desired data. The binders can be readily opened, the diskettes read and put back on the shelf until the desired diskette is located.

This search process can be even more efficient if a catalog of locations and contents of all envelopes is maintained for all the binders on the shelves. The present invention of the diskette file is the only device which makes the locations of diskettes to be designated, assigned and cataloged, feasible. The librarian in charge of the diskettes can be more productive in knowing where the material should be and whether it is there in fact.

An additional object of the invention of this diskette file is to serve as an appropriate format of keeping very large numbers of diskettes. In addition to the cataloging feature of the invention, the diskette file is the most compact system of storing the diskettes. The book-like binders are conceived so that they can be shelved on their side, with the top of the covering case in an upright vertical position being exposed for an observer to read the contents of the binder, in exactly the same set-up as books are in libraries. As noted before, the diskette file is also designed to accommodate bookbinding reinforcement.

Aside from the benefits provided by the structure of the invention to those who will be using it, the invention also provides a simple, inexpensive method of manufacturing the diskette file itself. The envelopes can be made and assembled with existing machinery. Conventional cutting, folding and glueing is only needed. Thus, the basic diskette file can be manufactured at a modest cost. The diskette file can also be enhanced with moderate artisanal additions.

Some of the improvements and modifications are mentioned in parts of this specification; many other improvements and modifications would normally be carried out by anyone expert in the field of making binders for diskettes. These improvements and modifications, stated, or not, in this specification, do not change the basic conception of the invention of the diskette file nor to the method of making it.

BRIEF DESCRIPTION OF THE DRAWINGS

The following detailed description of the invention will refer to the following drawings.

DESCRIPTION OF THE INVENTION

The following detailed description of the invention will refer to the drawings in FIG. 1 through FIG. 12. The diskette file presented in these drawings is one which would be suitable for 10 microcomputer diskettes of the most common size of 5¼ inch. The structure and method of assembly of a diskette file for any other number of diskettes, greater or smaller, would be exactly identical except for an appropriate adjustment for the thickness of the file, that is the width of sections 32 and 42 in FIG. 7. Likewise, the structure and method of construction of a diskette file for smaller and larger size diskettes, such as those measuring 3½ inch, is identical to the one described here, except for an appropriate increase or decrease in all sections.

Figure 1:
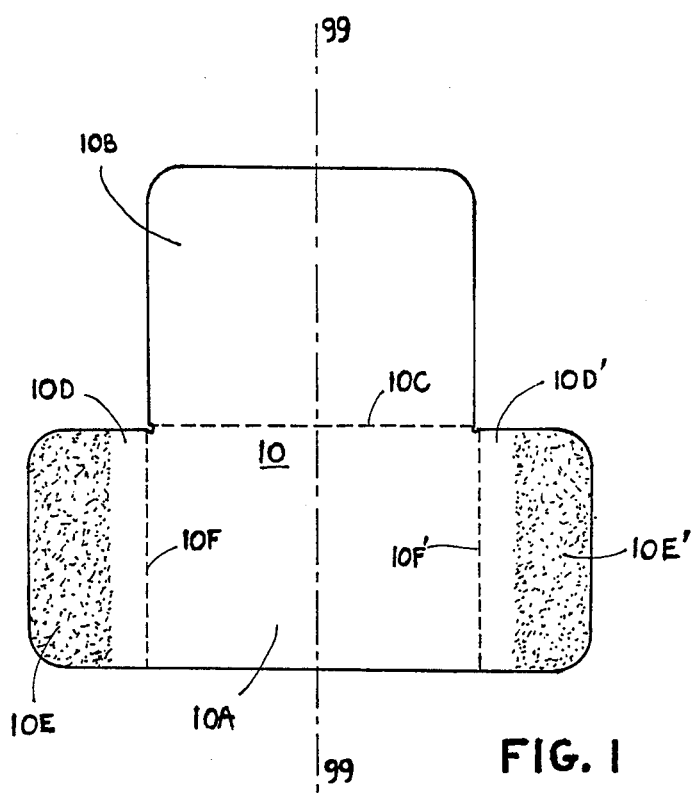
FIG. 1 is a plan view of a single envelope.
Figure 5:
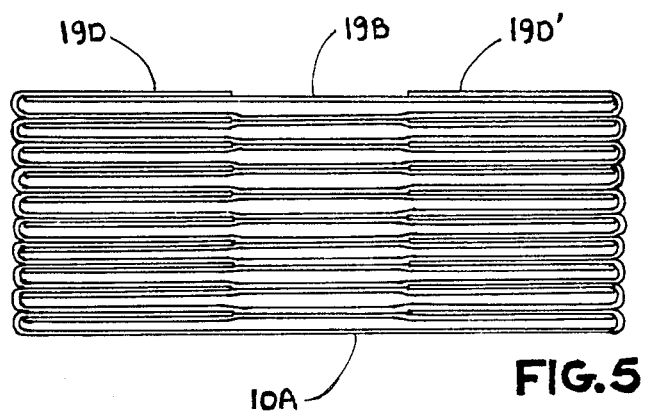
FIG. 5 shows an assemblage of envelopes from the top.
Figure 6:
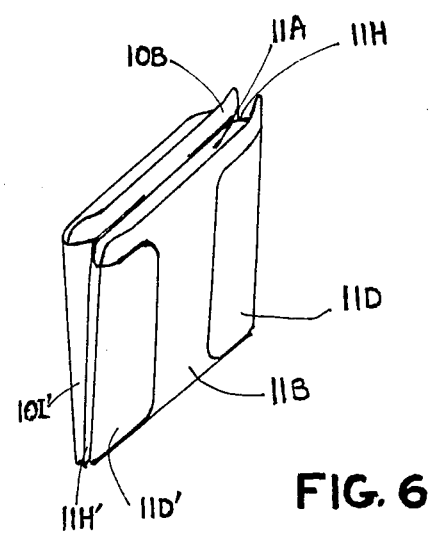
FIG. 6 shows how two consecutive envelopes are affixed.

All the parts of the structure of the invention are referenced by numerals, except for the following two rules which are intended to facilitate the understanding of the description:

(1) since the assemblage of envelopes is made of identical envelopes, identical sections of each of the 10 envelopes have similar designations (A throught I); for example, the back of the first envelope is designated section 10B shown in FIG. 1, the back of envelope 11 is section 11B shown in FIG. 6, and similarly, the back of envelope 19 is 19B shown in FIG. 5.

(2) each envelope is symetrical about a vertical axis 99—99 shown in FIG. 1, which goes through the middle of the envelope; therefor, symmetrical sections have same numerals except for a prime.

In FIG. 1, a single envelope is shown. The envelope described is envelope 10, the first envelope located in the front of the assemblage of envelopes shown in FIG. 4. As shown in FIG. 1, each envelope is made of a single planar blank 10. The blank is made of any suitable weight and strength material such as paper, reinforced or not, plastic, plastic coated fabric, or any other material which a person skilled in the art of making diskette files would use for sufficient strength and durability.

As shown in FIG. 1, blank 10 is comprised of 4 sections 10A, 10B, 10D and 10D'. The 4 sections are generally rectangular, except for any outside angles being rounded for sections 10B, 10D and 10D'. Section 10A has a length which exceeds the size of the diskette for which the envelope is designed by approximately ⅛ inch. The width of section 10A is approximately 4/5 ths of the length. Section 10A is the front of the envelope. Section 10B is the back of the envelope. Section 10B is adjoining section 10A along crease line 10C. Section 10B has the same length as section 10A and a width which exceeds the width of section 10A by approximately ¼ inch. Sections 10D and 10D' are adjoining section 10A widthwise along crease lines 10C and 10C'. In forming the envelope, areas 10E and 10E' of sections 10D and 10D' are coated with a bonding compound applied to them. The bonding compound is any paste, glue or other adhesive, such as hot hide glue, or polyvinyl acetate, or any other nonrigid bonding compound which a person skilled in making diskette files would use.

Figure 2:
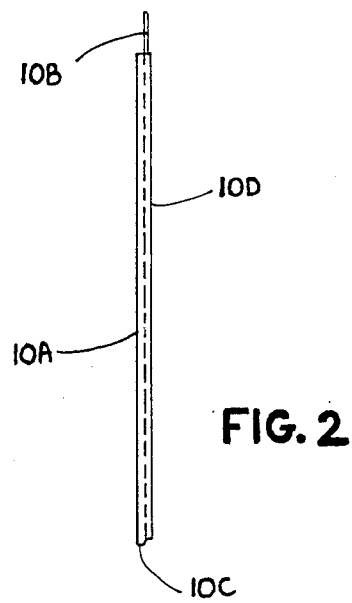
FIG. 2 is a side view of an envelope.

In FIG. 2 the envelope made of blank 10 is assembled. The scale of FIG. 2 is twice the scale of FIG. 1. Section 10B is folded over section 10A along crease 10C. Then sections 10D and 10D' are folded over the back of section 10B along creases 10F and 10F' (shown in FIG. 1). Sections 10D and 10D' become permanently coupled to the back of section 10B with the presence of the bonding compound in areas 10E and 10E'.

Figure 3:
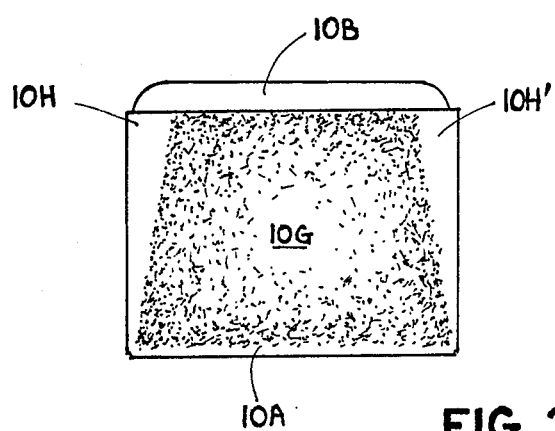
FIG. 3 is a front view of an envelope.

In FIG. 3 the completed envelope made of blank 10 is shown from the front. Section 10B overlaps section 10A by approximately ¼ inch. On the front of the envelope in a portion of section 10A a bonding compound is applied in area 10G. Section 10G is generally trapezoidal leaving sections 10H and 10H' of section 10A free of any bonding compound. These areas 10H and 10H' are generally triangular with the top side approximately ½ inch. The bonding compound may be the same compound used for areas 10E and 10E', that is any suitable non-rigid adhesive material which a person skilled in the art of making diskette file would use.

In FIG. 6 two envelopes, 10 and 11, are affixed to each other by means of the bond between sections 11A, 10B and portions of 10D and 10D'. The area bonded is of the shape of 11G* which is, as indicated in the second paragraph of the description of the invention, identical to the area 10G. The two envelopes are permanently coupled. The coupling may be reinforced with any suitable method (not shown in the present drawing), such as stichting, stapling, riveting, or any appropriate reinforcement which a person skilled in the art of making diskette files would use, and which could make the need for any bonding compound unnecessary. When the assemblage of envelopes is stretched, sections H and I and sections H' and I' form angles which separate the front and back sections of each envelope as illustrated in FIG. 6.
(* 11G is not conveniently referenced in the drawing being between 10B and 11A.)

Figure 4:
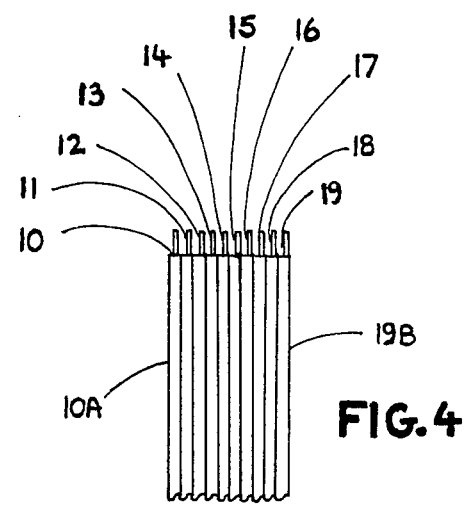
FIG. 4 shows an assemblage of envelopes from the side.

In FIG. 4, all ten envelopes 10, 11, 12, 13, 14, 15, 16, 17, 18 and 19, are affixed to each other in the same pattern as described in the preceding paragraph. The assemblage of envelopes shown in FIG. 4 may be reinforced at the bottom with any suitable method (not shown) such as stitching bands, stitching tapes, using saddle-stitching or saddle-wire, affixing supercloth or any other suitable method which a person skilled in the art of making diskette files would use.

In FIG. 5 the assemblage of envelopes is seen from the top. The scale of FIG. 5 is twice the scale of FIG. 1 The front of the assemblage of envelopes in made of the front section 10A of the first envelope. The back of the assemblage of envelopes is made of the back section of the last envelope 19B and sections 19D and 19D' which have been permanently affixed to section 19B.

Figure 7:
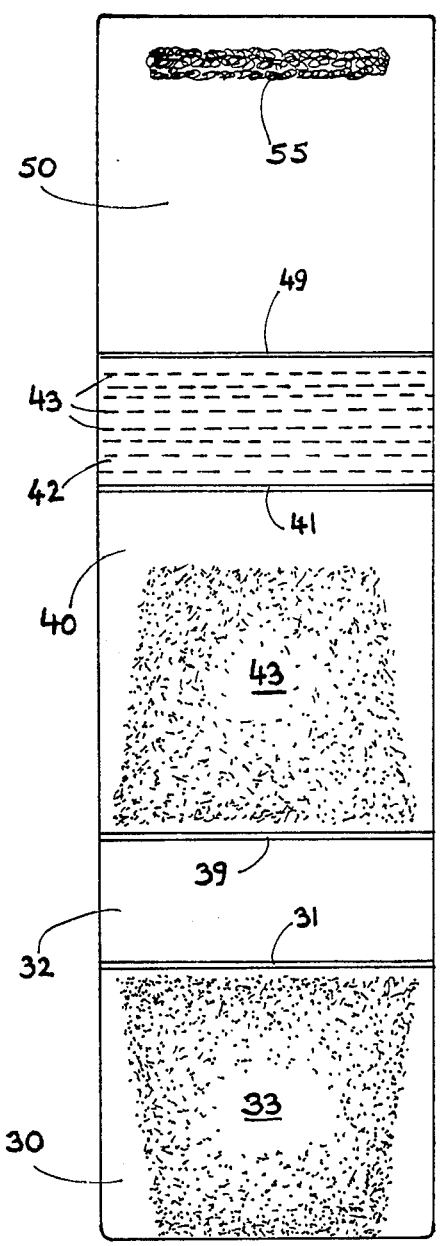
FIG. 7 is a plan view of the covering case.

In FIG. 7 the blank for making a covering case in shown. The covering case is comprised of 5 sections: 30, 32, 40, 42 and 50. The blank of the covering case is made of a suitable weight and strength material such as cardboard, reinforced or not, plastic, plastic covered rigid structure fabric, leather, or any combination of these materials which a person skilled in the art making diskette files would use. The present description is relevant for the use of a medium weight cardboard.

Figure 10:
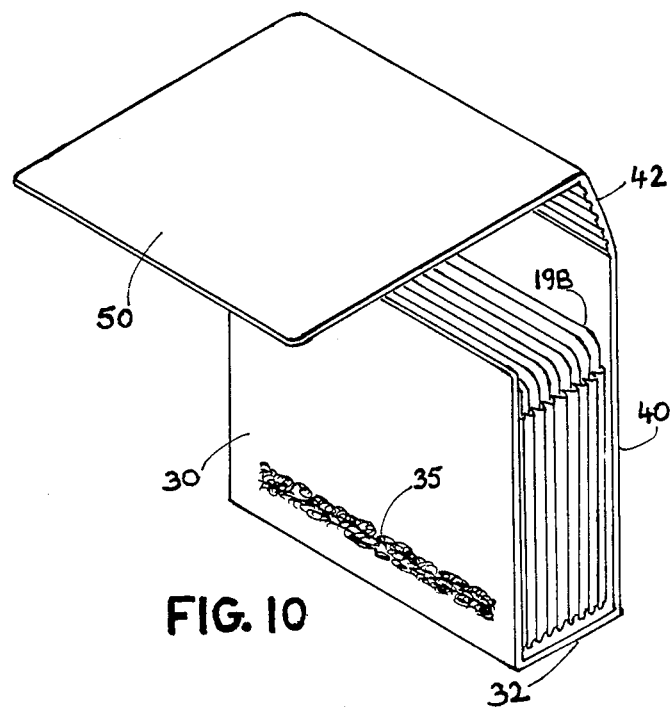
FIG. 10 shows the binder partially opened.

Section 30 shown in FIG. 7 is generally rectangular with a width corresponding approximately to 4.5/5 ths of the size of the diskette for which the binder is intended; thus, it is approximately the same as the width of section 10B of the first envelope. The length of section 30, which is also the length of all the other sections of the covering case, is approximately ⅛ inch larger than the first envelope section 10A length, and therefore about ¼ inch larger than the diskette for which the diskette file is designed. Section 30 is the front panel of the completed binder as shown in FIG. 10.

Section 32 shown in FIG. 7 is coupled to section 30 along grove 31. Section 32 is the bottom of the completed binder as shown in FIG. 10. The width of section 32 is the the thickness of the assemblage of the envelopes with the diskettes (not shown) inside the envelopes in FIG. 4; for instance, for 10 diskettes the thickness of the assemblage of envelopes inclusive of diskettes is approximately 1 inch.

Figures 8, 9:
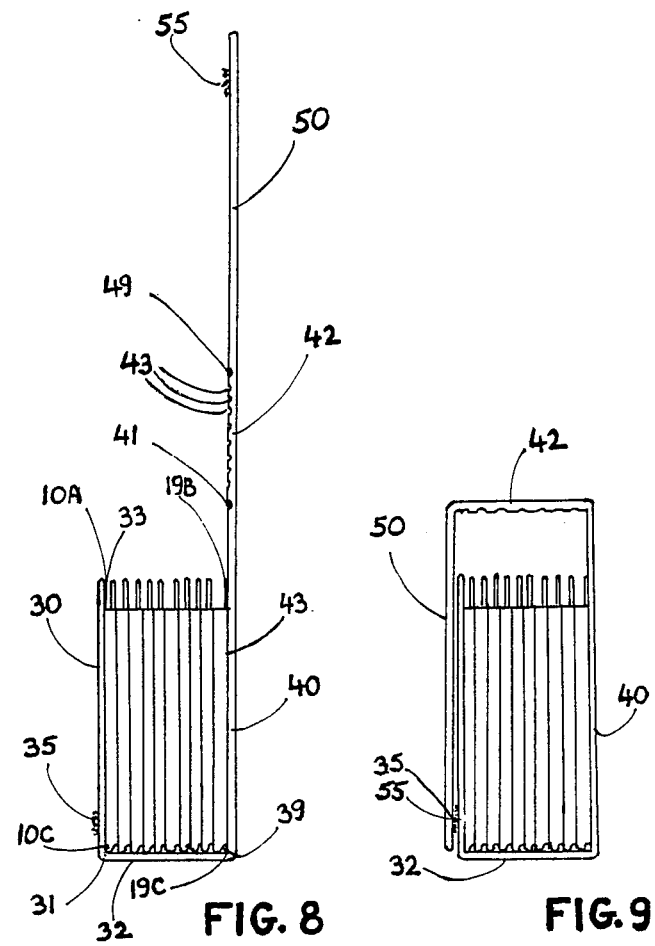
FIG. 8 shows how the assemblage of envelopes is affixed to the covering case.
FIG. 9 is a side view of the assembled binder.
Figure 11:
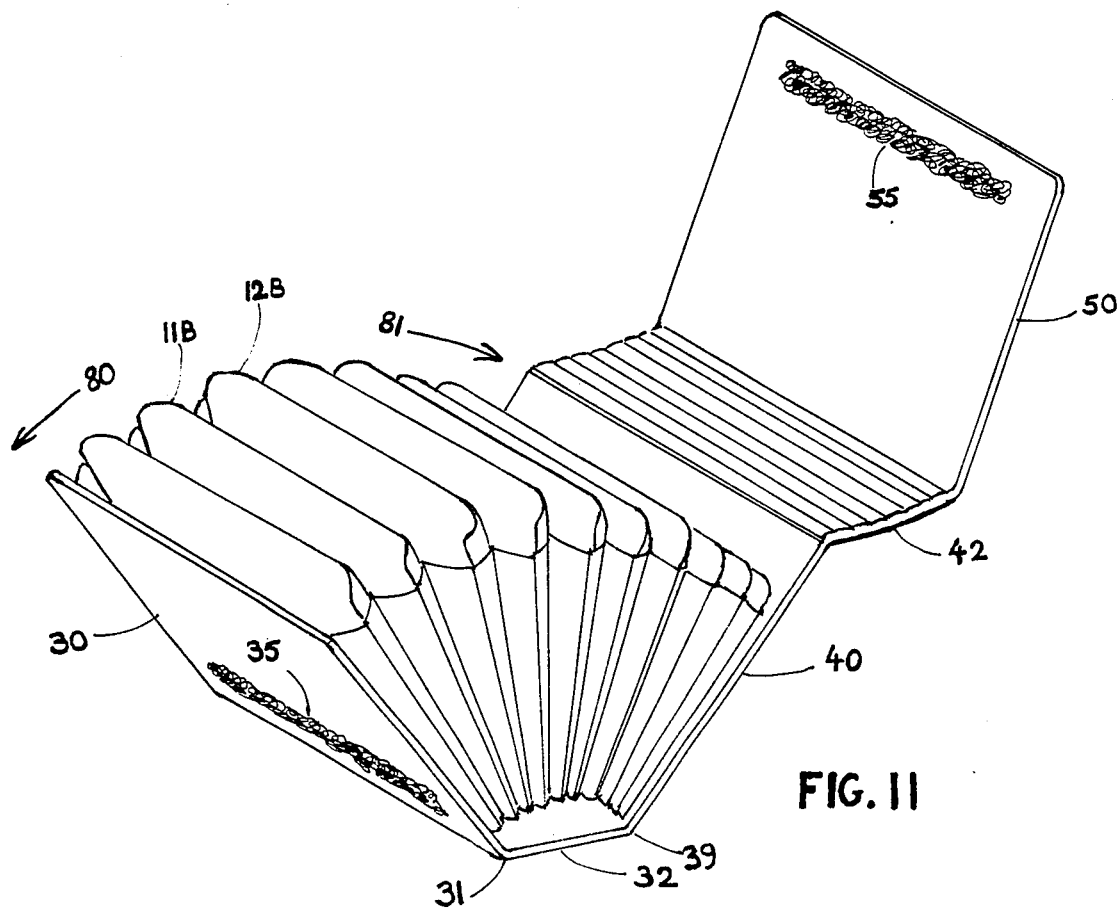
FIG. 11 shows an expanded open binder.

As shown in FIG. 7, section 40 of the covering case is adjoining section 32 along groove 39. Grooves 31 and 39 are intended to allow sections 30 and 40 to hinge on section 32 when the assemblage of envelopes is expanded as shown in FIG. 11. Section 40 is the back panel of the completed binder as shown in FIG. 9. Section 40 is generally rectangular with the length same as that of section 30 and width approximately ⅛ inch larger than the size of the diskette for which the diskette file is designed.

Section 42 is adjoining section 40 along groove 41. Section 42 is the top of the completed binder as shown in FIG. 9. Section 42 is rectangular with length same as that of section 30 and width approximately 1/16 inch larger than section 32. Section 42 is grooved lengthwise with grooves 43. Grooves 43 allow section 42 to enclose the diskettes (not shown) when the diskette file is closed as shown in FIG. 9, and to fold back when the diskette file is open as shown in FIG. 11. When bookbinding methods are used to reinforce the covering case, then groves 43 may not be necessary and use of supercloth, leather, fabric, plastic, or any suitable material which a person skilled in the art of making diskette files would use, would allow the flexibility desired for section 42.

Section 50 is adjoining section 42 along groove 49. Section 50 is the flap of the covering case as shown in FIG. 10. Section 50 is generally rectangular with width the same as that of section 30 and length ⅛ larger than the size of the diskette for which the diskette file is designed.

As shown in FIG. 7, area 33 of section 30 and area 43 of section 40 are applied with a bonding compound. The bonding compound may the same as the one used in areas C of each envelope to couple the envelopes. Areas 33 and 43 have the same trapezoidal shape and size as areas G of the envelopes.

As shown in FIG. 8, the assemblage of envelopes is affixed to the covering case by coupling area 43 of section 40 to the back of the last envelope's section 19B. Crease 19C is aligned to fit along grove 39. Section 32 folds over the bottom of the assemblage of envelopes and crease 10C fits along side grove 31. Section 30 folds over the assemblage of envelopes. Area 33 of section 30 is coupled to the front of section 10A to form a permanent bond between the front of the assemblage of envelopes and front panel of the covering case.

As shown in FIG. 9, section 50 forms a flap which folds over the front of section 30. When flap 50 is folded over the front panel 30 in such a fashion, section 42 provides just enough room between the bottom of any envelope and the inside of section 42 for the size of diskettes (not shown). Thus, when flap 50 is folded over section 30, the diskettes (not shown) in the assemblage of envelopes are snuggly held by section 42.

As shown in FIG. 8, to the outside of the front panel 30 is affixed a band 35 of self entangling material. A band 55 of similar material is affixed to the inside of the flap 50. When flap 50 is folded over the diskette file, as shone in FIG. 9, the two bands 35 and 55 overlap and mesh to form a temporary coupling which keeps the diskette file closed. Any other suitable temporary closing method may be used, such as clasp with eyelet, string or elastic band around entire diskette file, strap or hoop, or any other appropriate device which a person skilled in the art of making diskette files would use.

As shown in FIG. 10, the sections B of each envelope, such as 19B, stand out above the structure of the assemblage of envelopes. Even when the diskette file is closed as in FIG. 9, the sections B of all envelopes are kept separated from each other by approximately a width corresponding to the thickness of a diskette for which the diskette file is designed. The outstanding portion of the B sections and the permanently open state of the envelopes facilitate the introduction of any diskette into its assigned envelope and prevents possible damage to the entire assemblage of envelopes (should a diskette be forced into it sideways). This introduction of diskette is further eased when every envelope is slightly expanded as the diskette file is opened as shown in FIG. 11.

As shown in FIG. 10, section 40 exceeds the length of section 19B by approximately ⅛ inch, as previously specified, and therefore the assemblage of envelopes affixed to it. This extension provides protection to the envelopes from wear and tear. Such protection is essential when the diskette file is standing on its side as shown in FIG. 12.

As shown in FIG. 11, the assemblage of envelopes is expanded when action 30 is inclined forward along hinge 31 by a pull 80, and section 40 is inclined backward along hinge 39 by a push 81. The assemblage of envelopes forms a fraction of a ring. Each envelope is expanded by the angle formed by sections H with I and H' with I' of each envelope, as has been previously outlined for FIG. 6. The assemblage of envelopes is prevented from expanding too far by a combination of
  (1) the structure of each envelope,
  (2) the rigidity of section 32, and
  (3) the presence of diskettes in the envelopes (not shown).

As shown in FIG. 11, the back sections (such as 11B and 12B) of two consecutive envelopes form an angle of over 6 degrees for a moderately expanded diskette file. This angle is sufficient to create a separation between two successive diskettes (not shown) lodged in envelopes in excess of ½ inch at the top of diskettes (not shown). This separation allows the label of the diskettes (not shown) to be seen by an observer holding the file in front of himself.

Figure 12:
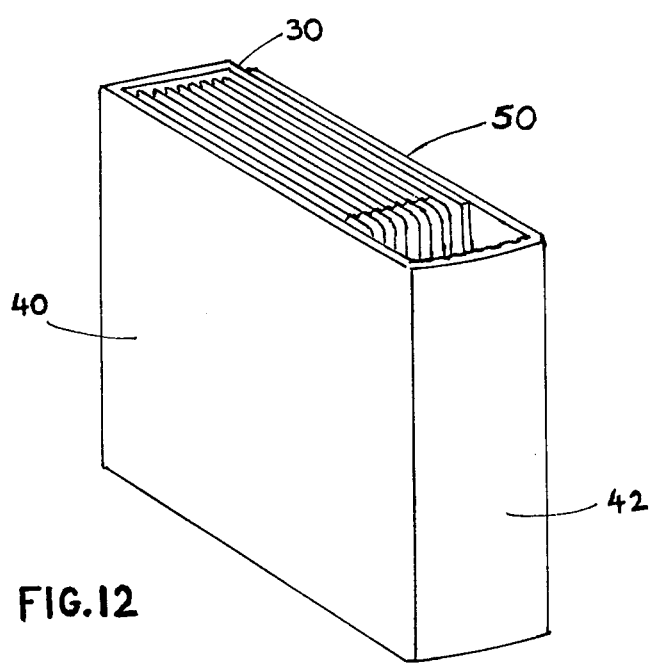
FIG. 12 show a diskette file on its side, the way it would be filed on a shelf.

As shown in FIG. 12, when flap 50 is secured to the front of section 30, the tighly closed covering case permits the diskette file to stand on its side. Standing on its side the diskette file may be stored on shelves along side other diskette files. To facilitate this method of storage, the covering case may be strengthened by any suitable mean, such as reinforcing with heavy weight cardboard sections 30, 40 and 50, protecting the entire covering case with buckram, canvas, leather, plastic, kraft paper, book cloth or any other appropriate material which a person skilled in the art of making diskette files would use, and reinforcing section 42 with an appropriate headband.

Among the possible modifications of the diskette file are the alternative structures of the assemblage of envelopes, which do not change the other aspects of the specifications. A first alternative method of forming the assemblage is by using a single unitary blank instead of individual envelopes. The blank is composed of (1) all front and back sections 10A, 10B, 11A, 11B, 12A and so on, adjoining along fold lines, (2) where all front A and back B sections are identical, and (3) with cut-outs for sides, 10D, 11D . . . and 10D', 11D'. . . (as in FIG. 1). The assemblage is formed in a similar fashion to that described, except that the front (e.g. 11A) fold over the back (e.g. 10B) of consecutive envelopes to be glued.

A second method of forming the assemblage is to use a blank of successive and identical front and back sections 10A, 10B, 11A, 11B, 12A and so on, but the 2 sides are formed from 2 separate blanks of successive side sections 10D, 11D, 12D . . . and 10D', 11D', 12D'. . . . These sides are folded and inserted in between the glued areas of consecutive front and back sections when the assemblage is formed.

The third method uses the same 2 blanks of successive sides sections, but the front and back sections are made of separate rigid individual sections and are glued to the sides when these are folded to form the assemblage. Several other methods can also produce the desired assemblage by using continuous cut-outs of consecutive sections 10D, 10A, 10D', 10B, 11D, 11A, 11D', 11B, 12D and so on, where D and B sections adjoin along their side. All these methods would not change the essential features of the invention, and the simplest method has been presented in the drawings and the description.

Although the present description is referring to a diskette file for the most commonly used type of diskette, this reference is only for illustrative purposes: it is understood that the sizes, dimensions, proportions, shapes and materials may be changed and modified to adapt to the type of diskette for which the diskette file is intended or the strength and durability desired from that diskette file. Some of these possible modifications have been briefly mentioned in the above paragraphs. Whether mentioned or not, these modifications do not change the object of the invention nor the nature of the claims set forth.

What is claimed is:

1. A binder for storing computer magnetic diskettes comprising a plurality of envelope sections attached to one another in an accordian-type manner and encased within a cover wherein:
  each envelope section is configured and dimensioned to substantially accommodate a single computer diskette therein and comprises a front panel and a rear panel joined together along their respective side and bottom edges with said rear panel having a height greater than said front panel, said side edges having an inwardly facing generally U-shaped edge; said envelope sections being successively joined together with a bonding material with the rear panel of each envelope section completely adhered to the front panel of the adjacent panel except for the side edges thereof and the bottom of said front and rear cover panels spaced a fixed predetermined distance so as to permit said envelopes and binder to open in a controlled accordian, fan-shape like manner.

2. A binder as defined in claim 1, wherein the bonding material is applied to a panel of each envelope in such a manner that the assembled envelopes have pleated side edges.

3. A binder as defined in claim 1, wherein said bonding material is applied to an envelope panel in a general trapezoidal configuration leaving a triangular area at the edges of each panel free of said bonding material.

4. A binder as defined in claim 3, wherein the base of each said triangular area is at the top edge of said envelope panel.

5. A binder as defined in claim 1, wherein the cover comprises a plurality of hingedly connected sections encasing the assembled envelope sections, the front and rear envelopes of said assembly being adhered to the adjacent cover sections.

6. A binder as defined in claim 5, wherein the cover section underlying the assembled envelope sections confines the movement of the lower panel edges of each assembled envelope sections when said assembly is opened in a controlled accordian manner.

7. A binder as defined in claim 5 wherein each cover section is wider than each of the envelope sections.

8. A binder as defined in claim 5, wherein the last cover section overlies said first cover section and wherein said binder additionally includes means to fasten said last cover section to said first cover section.

9. A binder for storing computer magnetic diskettes comprising a plurality of envelope sections attached to one another in an accordian-type manner and encased within a cover wherein:

each envelope section is configured and dimensioned to substantially accommodate a single computer diskette therein and comprises a front panel and a rear panel joined together along their respective side and bottom edges with said rear panel having a height greater than said front panel, said envelope sections being successively joined together with the rear panel of each envelope section completely adhered to the front panel of the adjacent panel with a bonding material applied in a trapezoidal configuration leaving a triangular area of the edges of each panel free of said bonding material with the bottom edge of each panel bonded along their entire length so as to permit said envelopes and binder to open in a controlled, accordian, fan-shape like manner.

* * * * *